Sept. 28, 1937.                    C. R. JACK                    2,094,173
                            FREIGHT CAR AIR BRAKE
                            Filed May 9, 1936                4 Sheets-Sheet 4

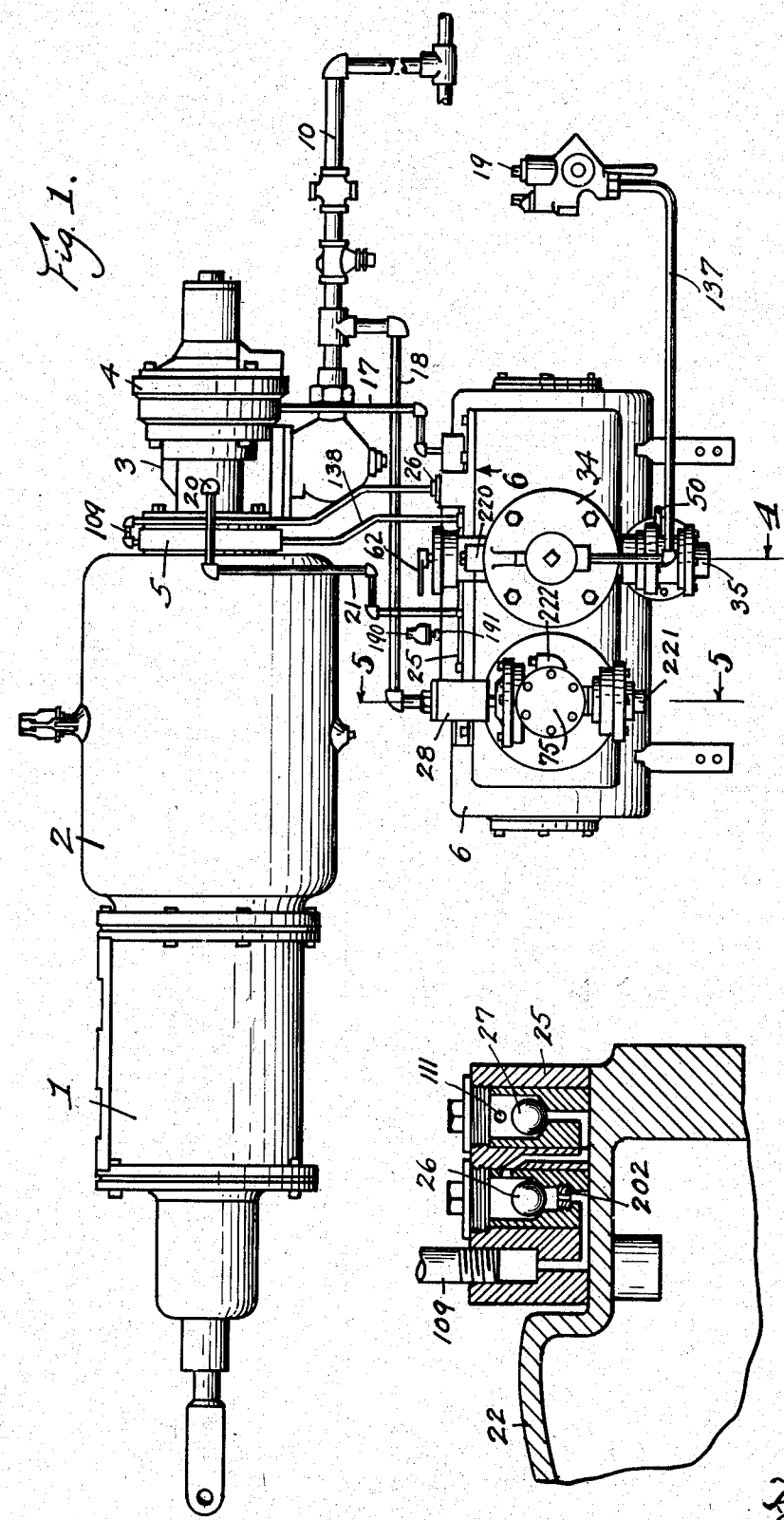

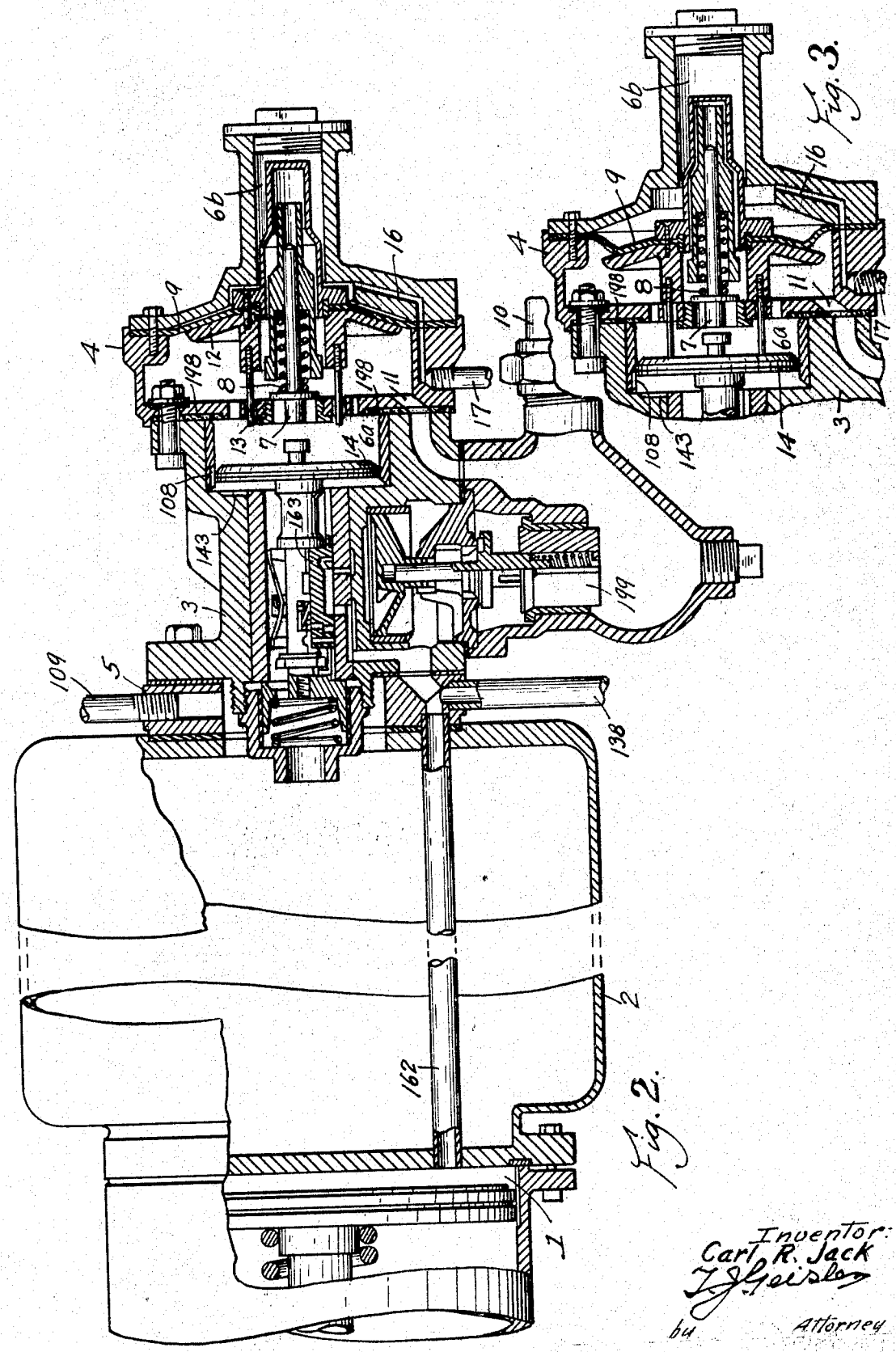

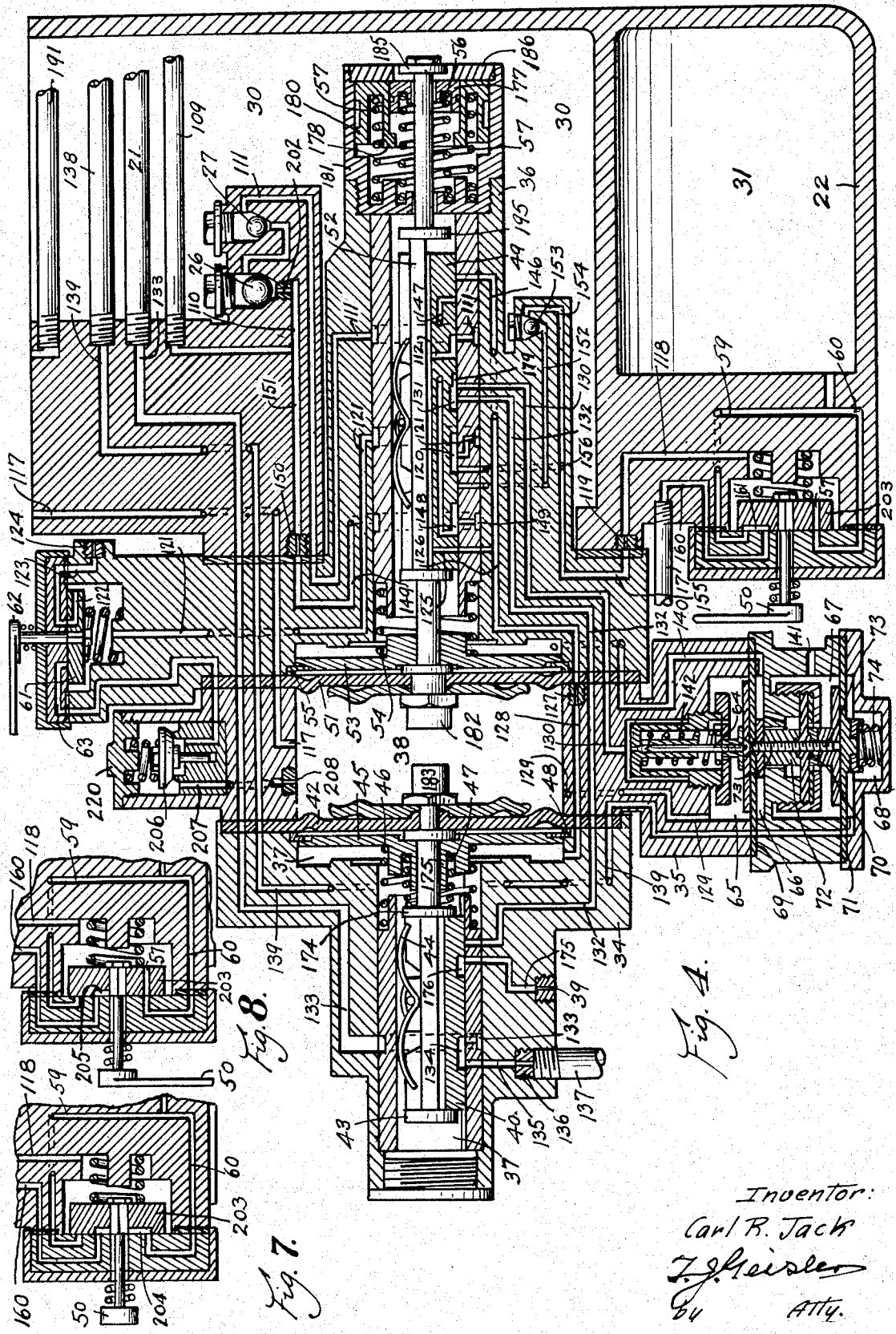

Inventor:
Carl R. Jack
by T. G. Geisler
         Atty.

Patented Sept. 28, 1937

2,094,173

UNITED STATES PATENT OFFICE 2,094,173

FREIGHT CAR AIR BRAKE

Carl R. Jack, Portland, Oreg., assignor to International Air Brake Control Company, Portland, Oreg., a corporation of Oregon Application May 9, 1936, Serial No. 78,893

24 Claims. (Cl. 303—35)

The principal object of my invention is to combine, or incorporate, with what is generally known as type K of railway freight car brake equipment—for example K2 triple valve—a means causing the triple valve to perform its functions more dependably, irrespective of the greater present-day length of freight trains, and under all the varying train handling conditions.

This application is in part a continuation of my co-pending application, Serial No. 693,609, filed October 14, 1933, entitled Air brake system.

My auxiliary control means may be used in combination with one of the said standard K-type of triple valves; this combination is, however, merely for convenience, so that the present system of railway freight car equipment may be continued in use; but my improvement may also be embodied in some other suitable type of valve, so as to form therewith a single device.

The brakes of a long freight train are applied serially by the K triple valves from the head to the rear of the train. With the present standard K2 triple valve in freight car equipment, the fall of pressure in the brake pipe of the cars remote from the locomotive, in a long train, may not be of sufficient rate to actuate the triple valves so as to apply the brakes at the rear end of a long train in unison with those of the freight cars nearest the locomotive.

Furthermore, if the fall of pressure is too slow to actuate the triple valves, as may be the case near the rear of long trains, the fall of pressure may be insufficient to close the charging feeding groove of the triple valve, which would permit pressure to bleed thru the latter from the auxiliary reservoir of the triple valve into the brake pipe, thus tending to retard further the reduction of brake pipe pressure. The slide valve and piston of the K2 triple valve must be placed in applied position before a local quick service reduction in brake pipe pressure can be initiated.

The special purpose of my invention is to provide a quick service feature which is entirely independent of the operation of the triple valve itself; a further special purpose of my invention is to cause efficient propagation of the quick service brake pipe reduction towards the rear of the train in advance of the actual applications of the brakes of the cars.

I attain the objects of my invention by providing a supplemental reservoir in combination with the K2 triple valve, which supplemental reservoir is charged from the auxiliary reservoir of the K2 triple valve, and the pressure in the supplemental reservoir is held at the initial pressure of the air brake system. The supplemental reservoir pressure, according to my invention, is applied to actuate a diaphragm (or piston) operated valve in the auxiliary control feature of my invention, thereby causing the rapid reduction by dispersion of the brake pipe pressure.

Heretofore devices including a diaphragm-controlled valve have been used, but such valve was operated by the pressure in the auxiliary reservoir of the triple valve. Hence, in case of very slow reduction in the brake pipe pressure, as would be the case at the rear end of a long train, this diaphragm-controlled valve could not be depended upon to bring about a quick service pressure reduction.

Such undesirable condition would arise if for any reason the pressure in the auxiliary reservoir of the triple valve should reduce with the brake pipe pressure before the said diaphragm-controlled valve is operated, and thus not create sufficient differential of pressure to bring about quick service pressure reduction.

In order to prevent undesired loss of brake pipe pressure, or an undesired brake application, the auxiliary control feature of my invention provides means for stabilizing said diaphragm-controlled valve, said means being so arranged that a certain amount of reduction of brake pipe pressure is necessary before said diaphragm-controlled valve will be operated.

A further object of my invention is to provide means for dissipating possible surges in the brake pipe pressure due to the termination of the initial rapid rate of reduction of brake pipe pressure. This object I attain automatically by providing means for restricting the quick service reduction passage of the brake pipe before closing said passage, so that when the brake pipe pressure has been reduced to a predetermined amount, there will be a gradual leveling off of the pressure in said brake pipe.

Another object of my invention is to provide automatic means for reducing the quick service reduction in grade work, when the brake cylinder retainer is set to retain pressure.

I attain this object by providing a special diaphragm (or piston) operated valve controlled by predetermined differential between pressures in brake pipe and the supplementary reservoir of my control.

This valve is further adapted to be operated by brake cylinder pressure, when the brake pipe pressure has been reduced a predetermined amount below that of said supplementary reservoir pressure of my control, and the brake cylinder pressure has built up to a predetermined amount. Under the last mentioned conditions my said special valve functions to terminate further quick service brake pipe reduction.

In case of grade work where the standard brake cylinder retainer is set to retain brake cylinder pressure, this retained pressure, when a service reduction is initiated, will cause an early functioning of my said special valve to terminate further quick service reduction of brake pipe pressure.

Another important object of my invention is to delay the application of the brake at the vicinity of the head end of the train, and so that the heavier the brake pipe reduction initiated the longer the application of the brakes at the head end of the train will be delayed. In case of comparative light brake pipe reduction it is not necessary to delay application of the brakes at the head of the train as long as in cases of heavy brake pipe service or emergency reduction.

With the standard K2 triple valve equipment all the pressure for releasing the brakes or boosting the brake pipe pressure, in releasing or charging the system, comes from the locomotive; hence, due to brake pipe friction, the rate of rise of pressure in the brake pipe in the vicinity of the rear of a long train is very slow, and may not insure a prompt movement of the triple valve piston to release position. With my special control a supplementary reservoir is charged to initial pressure during the charging of the brake system, and retained at that pressure until a release is initiated. When the brake pipe pressure is raised slightly, as when release is initiated, this excess pressure stored in the supplementary reservoir is carried to the brake pipe, thus rapidly propagating the initial rise of brake pipe pressure towards the rear of the train irrespective of its length, hence insuring a quick and positive movement of all valves of the system to release position.

In releasing following an emergency application, it is usually necessary to increase the brake pipe pressure above that of the auxiliary reservoir emergency equalization pressure before the brake cylinder pressure can be released. Therefore, a further purpose of my special control is to provide means for reducing the auxiliary reservoir pressure after a recharge of the brake system has been initiated by the engineer. This object of my invention is accomplished by providing a supplemental reservoir charged to initial pressure during the charging of the brake system, and retained at that pressure until a release is initiated. When the brake pipe pressure is raised slightly, as when release is initiated, this excess pressure, stored in the supplemental reservoir, is carried to the brake pipe and the auxiliary reservoir is caused to be reduced in recharging of said supplemental reservoir.

The above mentioned and other incidental features of my invention are hereinafter fully described with reference to the accompanying drawings.

In the drawings:

Fig. 1 shows a side elevation of my auxiliary control feature connected to the brake cylinder and auxiliary reservoir of the so-called K2 triple valve of a railway freight car air brake system;

Fig. 2 shows a fragmentary longitudinal vertical section thru the brake cylinder, auxiliary reservoir, and the triple valve unit with my special features incorporated therewith; in this figure the elements of the triple valve unit are shown in released and charging position;

Figures 5, 9:
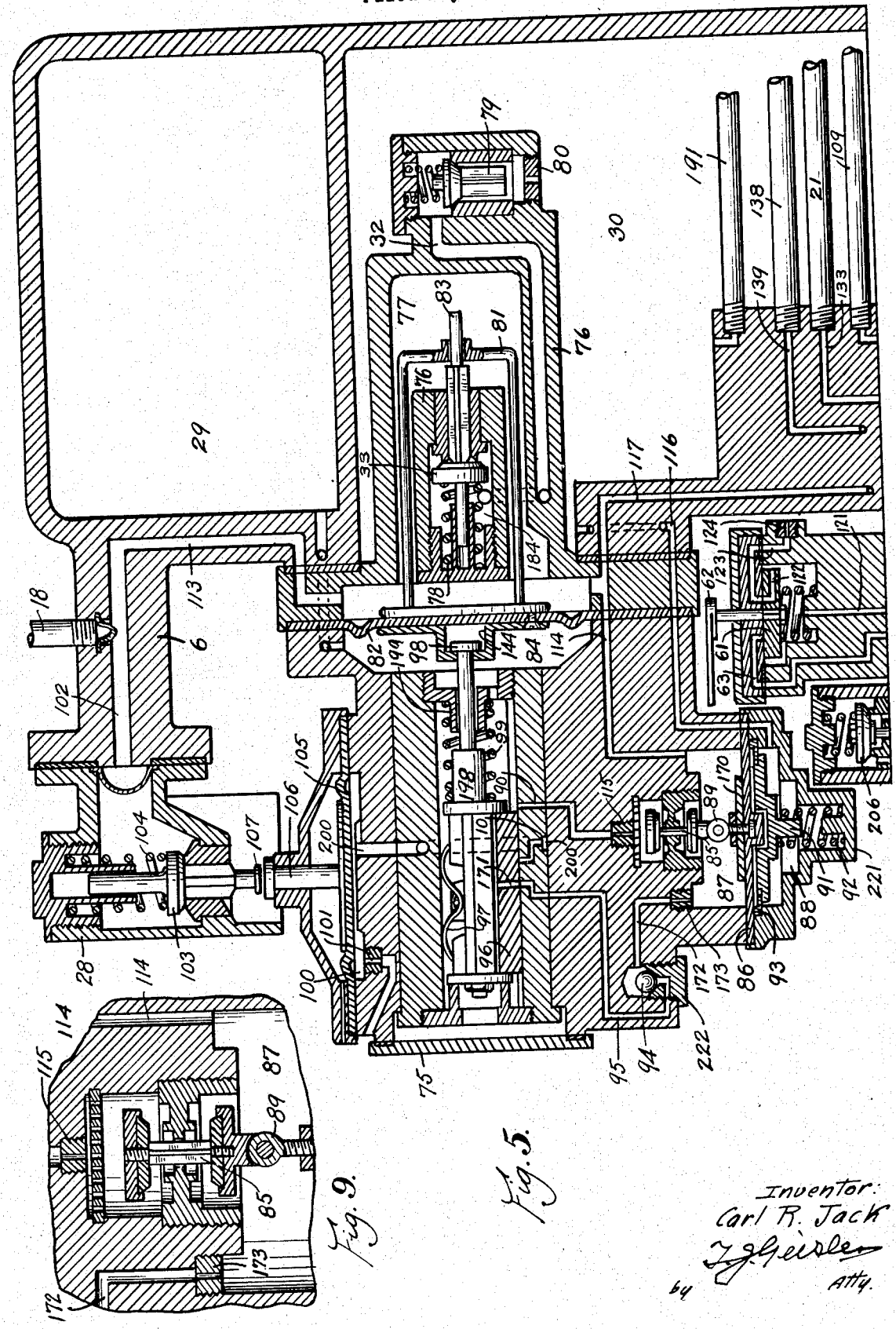

Fig. 3 shows a similar fragmentary section including, however, only the piston of the triple valve unit, which in this figure has been moved into position to close the charging feed groove, and the diaphragm of my special feature devices controlling the piston is flexed to the left in response to differential pressure, thereby restraining the movement of the triple valve piston into application position;

Fig. 4 shows a diagrammatic section on the line 4—4 of Fig. 1;

Fig. 5 shows a diagrammatic section on the line 5—5 of Fig. 1. It is to be noted that sections shown by Figs. 4 and 5, while on different planes, for convenience are assembled in the digrammatic sections on a single plane; and certain parts shown in these sections, while actually not within the plane of the sections, are included so as to make these sections diagrammatically complete. Furthermore, the lower part of Fig. 5 overlaps and duplicates the upper part of Fig. 4, as will be noted, so as to facilitate the connective reading of Figs. 4 and 5;

Fig. 6 is a larger scale fragmentary transverse section of the check valves 31 and 32 on the line indicated by the arrow 6;

Figs. 7 and 8 show the manually controlled valve 203 in different positions than shown in Fig. 4, and Fig. 9 shows an enlarged section of check valve 85 which controls charging of accelerator reservoir 29, said valve also being seen in Fig. 5.

Referring to Figs. 1 and 2:

The numeral 1 represents the brake cylinder, 2 is the auxiliary reservoir, 3 the triple valve unit, 4 is what I shall term the brake application delay portion of my special feature, or attachment to the triple valve unit; 5 is an adapter to facilitate the connection of my auxiliary control 6 to the auxiliary reservoir 2 and the brake cylinder 1 of the triple valve.

The elements of the triple valve unit 3 are those common to the type K2 triple valves used on railway cars of freight trains. As apparent, these elements are shown in their release and charging position. It is to be noted that the usual cap of the triple valve 3 is removed, and is replaced by my said brake application delay portion 4; but the standard graduating stem 7 and spring 8 of the triple valve unit 3 have been retained.

My brake application delay portion 4 comprises two chambers 6a and 6b separated by a diaphragm 9. The triple valve side of this diaphragm 9 is connected to the brake pipe 10 by the usual passages 11. The diaphragm 9 carries a head 12 provided with plungers 13. The purpose of this arrangement is to limit the movement of the triple valve piston 14, said plungers 13 normally being positioned as shown in Fig. 2. The chamber 6b on the other side of the diaphragm 9 constitutes a delay chamber, connected to my auxiliary control 6 via passage 16 and pipe 17.

In addition to the above mentioned connections to my auxiliary control element 6, there is a connection 18 direct from the brake pipe 10 to my said auxiliary control element 6, as seen in Fig. 1.

The brake cylinder retainer 19, which is usually connected to the exhaust passage 20 of the triple valve unit 3 is connected to my auxiliary control element 6 via pipe 137.

Referring now to the diagrammatic sections taken on lines 4—4 and 5—5 of Fig. 1, and shown respectively in Figs. 4 and 5 of the drawings: My auxiliary control element 6 consists of a pressure chamber 22 to which the housings containing the pressure control members are fastened. A cylinder cap 25 (see Fig. 1) is provided on the main unit of my control attachment, and contains all pipe connections together with check valves 26 and 27. Valve housing 28 is also connected to said cylinder cap 25. The various housings of my auxiliary control attachment are so arranged that they may be removed without disturbing pipe connections.

Cylinder 22 is divided into three compartments, namely, an accelerator reservoir 29, a supplemental reservoir 30, and a special reservoir 31. Ball check valves 26 and 27 control the charging of said supplemental reservoir 30. Said supplemental reservoir 30 has a reduction passage 32 (see Fig. 5) controlled by auxiliary vlave 33. This valve in its normal position closes said passage 32, and it is opened by a rise in brake pipe pressure.

One assembly of my auxiliary control 6 consists of housings 34, 35 and 36, inclosing an auxiliary pressure chamber 37, a brake pipe chamber 38, and said supplemental reservoir 30. The brake pipe chamber 38 has a reduction outlet 39, a release valve 40 controlling said outlet; and this release valve also controls the brake cylinder exhaust passage 133 from the triple valve 3. The release valve 40 is connected to diaphragm 42, and is actuated by pressure differentials between the brake pipe chamber 38 and auxiliary pressure chamber 37. Diaphragm 42 is connected to said release valve 40 by sliding member or stem 43. Spring 44 helps to hold said release valve 40 on its seat. A pressure plate 45, and its attached spring 46 offer resistance to the movement of diaphragm 42 and release valve 40 from normal position in the direction of said resistance, but permits an unrestricted movement of said diaphragm in the opposite direction. Spring 47 acts as a stabilizer to prevent undesired fluctuations. Ring 48 limits the travel of spring 46 in the direction of said diaphragm 42.

The open housing 36 extends into the supplemental reservoir 30, and contains a resetting valve 49 which also controls the brake pipe reduction outlet 39 and connections from the auxiliary reservoir 2 of system to the special reservoir 31 of my control. This valve 49 also controls reduction outlet 121 from the special reservoir 31, which outlet may go to the brake pipe or to the atmosphere. Said resetting valve 49 further controls the connection from the auxiliary reservoir 2 and my supplemental reservoir 30 to auxiliary pressure chamber 37; and from auxiliary reservoir 2 to supplementary reservoir 30. This resetting valve 49 is actuated by pressure differentials between the brake pipe chamber 38 and supplemental reservoir 30. Diaphragm 51 is connected to said resetting valve 49 by sliding member or stem 52. Pressure plate 53, and its attached spring 54 offer resistance to movement of said diaphragm 51 in the direction of said resistance. Ring 55 limits travel of said spring 54 in the direction of said diaphragm 51.

Said diaphragm 51 is allowed limited free movement in one direction—towards the left—but further movement is restricted by springs 56 and 57.

Said sliding member or stem 52 is permitted limited longitudinal movement without moving said resetting valve 49.

Valve 203 is manually operated by handle 50 and controls the passages 59 and 60, leading to and from special reservoir 31.

Valve 61 is manually operated by handle 62, and controls connections from my special reservoir 31 to brake pipe chamber 38, or to atmosphere.

Check valve 206 prevents a back flow of pressure from the brake pipe chamber 38 into my special reservoir 31 via the latter's reduction outlet 63.

A supplemental valve 64 also controls reduction outlet 39 from brake pipe chamber 38. The supplemental housing 35 is divided into four compartments, 65, 66, 67 and 68 by diaphragms 69, 70, and 71. Diaphragms 69 and 70 are connected by spacer 72 and screw 73. Said compartments 65, 66, 67 and 68 are connected to the brake pipe chamber 38, the supplemental reservoir 30 to the atmosphere, and to the brake cylinder, respectively.

When there is no pressure in the system, said supplemental valve 64 is held closed by spring 74. When brake pipe pressure in chamber 65 has been reduced, and brake cylinder pressure in chamber 68 has built up to a predetermined ratio with said reduction, said supplemental valve 64 will close said brake pipe reduction outlet 39.

Another assembly of my auxiliary control comprises housings 75 and 76, and their attached units. Housing 76 extends into the supplemental reservoir 30 and contains brake pipe pressure reservoir 77, and an auxiliary valve 33. The latter valve is held on its seat by spring 78. One side of said auxiliary valve 33 is connected to brake pipe reservoir 77, and its other side to my supplemental reservoir 30 by passage 32, controlled by check valve 79. Check valve 79 prevents back flow of pressure from brake pipe of the system into supplemental reservoir 30 via latter's passage 32.

A yoke 81 is carried by pressure actuated diaphragm 82, and the stem 83 of check valve 33 slides in said yoke. When a reduction of brake pipe pressure in reservoir 77 is initiated, said yoke 81 is permitted free movement without changing position of auxiliary valve 33, but a rise in brake pipe pressure will cause the unseating of said valve.

One side—the left side—of said diaphragm 82 is connected to accelerator reservoir 29. Charging of said reservoir 29 and its connected chamber 84 is controlled by double acting valve 85 and diaphragm 86. Chamber 87 is connected to brake pipe chamber 77. Chamber 88 is connected to supplemental reservoir 30. A reduction in brake pipe pressure effects the closing of said valve 85, thus preventing a recharge of chamber 84 and of accelerator reservoir 29 until an equalization of pressure in supplemental reservoir 30 and brake pipe pressure has been effected by a rise in the brake pipe pressure sufficient to unseat auxiliary valve 33 and thus connect said pressures.

Valve 85 is connected to diaphragm 86 by coupling 89, and said valve 85 is adapted to close charging passage 90, when moved in either direction from normal position. Said valve 85 is shown in its normal position, thus opening charging passage 90.

Pressure plate 91 with its attached spring 92 located in chamber 88 offers resistance to the closing of said valve 85 by rise in brake pipe pressure.

Ring 93 limits movement of said pressure plate 91 in the direction of said diaphragm 86.

A reduction passage 95 is provided for chamber 84 and controlled by check valve 94, which valve prevents recharge of chamber 84 via reduction passage 95.

In accelerator chamber 84 is incorporated an accelerator valve 96 held on its seat by spring 97, and by the pressure in said chamber 84. Accelerator valve 96 is connected to diaphragm 82 by sliding member or stem 98. Diaphragm 82 is longitudinally movable in the direction of accelerator valve 96 without changing the position of the latter. Accelerator valve 96 is held in its normal position by spring 99.

Accelerator valve 96 controls the connection from brake pipe to the chamber 84 of this valve, also controls connection from said accelerator chamber 84 to actuator chamber 100. Accelerator valve 96 in its normal position cuts off connection from said accelerator chamber 84 to the actuator chamber 100, and simultaneously relinquishes control of other connections. Said accelerator valve 96 is so positioned by a sufficient rate of reduction of brake pipe pressure in brake pipe reservoir 77 (governed by value of spring resistance 99 and size of duct 173) as to connect accelerator valve chamber 84 to actuator chamber 100, and simultaneously cuts off other connections. Actuator chamber 100 is connected to atmosphere at all times via restricted orifice 101.

The housing 28 is provided with auxiliary reduction outlet 102 for brake pipe pressure. Valve 103 controls said reduction outlet 102, and is held on its seat by spring 104 thus closing said outlet. Actuator diaphragm 105 controls plunger 106, whereby a rapid rise in pressure in actuator chamber 100 forces said plunger 106 against shoulder 107 of valve 103 controlling auxiliary reduction outlet 102, thus unseating valve 103 and opening outlet 102.

Supplemental reservoir 30 is provided with a manual release valve 190, see Fig. 1, which valve is connected to pipe 191 shown in Figs. 4 and 5, to permit manual release of the pressure in said supplemental reservoir 30.

Assume all valves of my auxiliary control in normal position, and all units charged to initial normal system pressure as shown by Figs. 2 to 5 inclusive, the charging of all units of my improved brake system is accomplished as follows:

Charging

Fluid pressure from train brake pipe enters chamber 6a to right of piston 14, see Fig. 2, via branch pipe connection 10. Piston 14 is positioned to the left, thus opening charging feedgroove 108, permitting charging of auxiliary reservoir 2. While the auxiliary reservoir 2 is being charged, the supplemental reservoir 30 is charged from said auxiliary reservoir 2 via pipe connection 109, passage 110, check valves 26 and 27, passage 111, and port 112 in resetting valve 49.

Simultaneously, fluid pressure enters chamber 77 to right of diaphragm 82, from train pipe thru brake pipe 10, pipe connection 18 and passage 113. Accelerator reservoir 29 is charged with brake pipe pressure from brake pipe chamber 77 via passages 114, chamber 87, duct 115 and passage 90. The charging rate of accelerator reservoir 29 is the same as the normal rate of rise of pressure in brake pipe chamber 77. Both sides of diaphragm 82 separating chambers 84 and 87 are charged at the same rate. Movement of diaphragm 82 towards the left is resisted by spring 78, hence, said diaphragm will remain in normal position while charging passage 90 is open. Fluid pressure from supplemental reservoir 30 is transmitted to the underside of diaphragm 86, via passage 116. Movement of diaphragm 86 downward is resisted by spring 92, and movement of spring 92 upward is limited by stop 93. The charging rate of supplemental reservoir 30 via the auxiliary reservoir 2 agrees with the normal rate of rise of brake pipe pressure, hence diaphragm 86 will not be moved from normal position, shown in Fig. 5, by a normal rate of rise in brake pipe pressure.

Chamber 38 to left of diaphragm 51 is charged from brake pipe pressure via passage 117 which connects with chamber 77. Pressure from supplemental reservoir 30 enters around stem 52 to right side of diaphragm 51. The charging rate of supplemental reservoir 30 is the same as normal rate of rise of pressure in chamber 38; furthermore, movement of diaphragm 51 towards the right from normal position is resisted by spring 54; hence diaphragm 51 and resetting valve 49 will not be moved from normal position by normal rate of rise in brake pipe pressure. In the normal position of resetting valve 49, special reservoir 31 is connected to atmosphere via passages 60, 57 and 118, duct 119, passages 155 and 156, port 120, and passages 121, 122, 123, and duct 124, hence elements of delay portion 4, see Fig. 2, controlled by pressure in said special reservoir 31 are rendered ineffective to influence operation of triple valve 3, in its release or application function. When resetting valve 49 is in normal position auxiliary chamber 37, to the left of diaphragm 42, is charged by pressure from supplemental reservoir 30 via port 125, passage 126, duct 127 and passage 128; and, furthermore, positioning of diaphragm 42 towards the left is resisted by spring 46, hence diaphragm 42 and its attached release valve 40 will not be moved from normal position by a normal rate of rise in brake pipe pressure. Brake pipe pressure is connected to the under side of release valve 40 via passage 129, chamber 65, supplemental valve 64 passage 130, port 131 in resetting valve 49, and passage 132. When the triple valve 3 of the system is in release position pressure in brake cylinder 1 is connected to atmosphere via usual exhaust passage 20, see Fig. 1; the pressure thus escaping via passages 21, 133, port 134 in said release valve 40, and passages 135, duct 136 and pipe 137.

Chamber 68 under diaphragm 71 is connected directly to brake cylinder pressure via passages 138 and 139. Brake pipe pressure is present above diaphragm 69 in chamber 65. Supplemental reservoir pressure is connected to the under side of diaphragm 69 and the upper side of diaphragm 70 via passage 140. The under side of diaphragm 70 is connected to atmosphere via passage 141. Diaphragms 69 and 70 are connected together by spacer 72. When there is no pressure in the system, supplemental valve 64 will be held in upper position by spring 74, thus closing passage 130, which helps to prevent unseating of release valve 40 and of resetting valve 49, while the brake pipe pressure initially enters the system. Pressure from supplemental reservoir 30, acting on upper side of diaphragm 70 will return diaphragms 70 and 69 to normal position. Supplemental valve 64 is now returned to normal position by spring 142, thus connecting passages 129 and 130.

In initiating release, or recharge, of brake system, the engineer's automatic brake valve is usually in release position, in which position main reservoir pressure, stored at locomotive, is connected directly to train brake pipe via large port opening in said automatic brake valve; thus the initial rate of rise in brake pipe pressure for valves located near the locomotive is very rapid as compared to the normal charging rate common for valves located remote from locomotives. The effect of such rapid rise of brake pipe pressure in my improvement is as follows:

A rapid rise of brake pipe pressure in chamber 6a to right of triple valve piston 14, Fig. 2, will move said piston to extreme left, thus to its retarded, recharge position. Charging of auxiliary reservoir 2 is the same as explained for normal charging, except at a slower rate, via usual triple valve 3 restricted charging passage 143.

If the rapid rise in brake pipe pressure in chamber 87 on diaphragm 86, Fig. 5, sufficiently exceeds charging rate of supplemental reservoir 30 to compress spring 92, it will seat valve 85, close charging passage 90, and prevent overcharge of small accelerator reservoir 29. When charging passage 90 is open any excess pressure in reservoir 29 will rapidly equalize with brake pipe pressure via both charging passage 90 and reduction passage 95, and thus prevent deflection of diaphragm 82 towards the left from normal position. Diaphragm support 144 is slotted to permit longitudinal movement of diaphragm 82 towards the left from normal position without disturbing valve member 96. Sufficient rise in brake pipe pressure in chamber 77, at the right of diaphragm 82, above pressure in chamber 84, will move said diaphragm 82 to the extreme left, thus compressing spring 78 and unseating auxiliary valve 33. Said sufficient amount of pressure is governed by value of spring 78. Brake pipe pressure is now connected to top of check valve 79 via passage 32, this check valve preventing recharge of said supplemental reservoir 30 via passage 32. While supplemental reservoir 30 is being recharged from auxiliary reservoir 2 of system, excess brake pipe pressure will be absorbed in recharge of the brake system, thus effecting a return of diaphragm 86 to normal position, and opening of charging passage 90 to permit further charging of accelerator reservoir 29. Diaphragm 82 and auxiliary valve 33 are returned to normal position by spring 78.

Sufficient rise in brake pipe pressure in chamber 38 above pressure in supplemental reservoir 30 will compress spring 54, thus moving resetting valve 49 to its extreme right position; said sufficient amount of pressure is governed by value of spring 54. In this position of resetting valve 49, connection from said supplemental reservoir 30 to auxiliary chamber 37 is closed, and chamber 37 is connected to auxiliary reservoir 2 via passage 128, duct 127, passages 126, 146, and ports 147 and 148 in resetting valve 49, which register with passage 149; thence thru duct 150, passages 151 and 109. Passages 132 and 130 are registered by elongated port 131 in resetting valve 49; also, elongated charging port 112 of resetting valve 49, which controls charging of supplemental reservoir 30, registers with passage 111 from auxiliary reservoir of the system; passage from special reservoir 31 to atmosphere is closed, and the pressure in auxiliary reservoir 2 of system is connected to special reservoir 31 via passage 149, elongated port 148, in resetting valve 49, which registers with passage 152, thence via check valve 153 and passages 154, 155, duct 119, passages 118, 57 and 60.

Chamber 6b, Fig. 2, to right of diaphragm 9 is charged to normal system pressure via passages 16, 17, 160, 161, 59 from special reservoir 31.

Rise in brake pipe pressure in chamber 6a above normal charge of system may effect an undesired overcharge of auxiliary reservoir 2, so that when brake pipe pressure is returned to normal pressure, the pressure in chamber 6a may be reduced below the pressure present in auxiliary reservoir 2, and thus cause an undesired movement of the piston 14 towards the right, thus placing it in application position, unless some means are provided for limiting such movement. With my invention this undesired action is prevented. Diaphragm 9 has a larger area than that of triple valve piston 14, thus when brake pipe pressure is reduced slightly below that of the pressure in auxiliary reservoir 2, plungers 13 will be moved towards the left, as shown in Fig. 3, thus limiting travel of said piston 14 to position closing charging feed groove 108. When brake pipe pressure has been increased above pressure in auxiliary reservoir 2, diaphragm 9 and piston 14, together with members controlled by piston 14, will be returned to normal position.

When pressures in brake pipe and supplemental reservoir 30 have equalized, diaphragm 51, Fig. 4, will be returned to normal position by spring resistance 54, but resetting valve 49 will remain in extreme right position, since stem 52 is permitted some free longitudinal movement before contacting said resetting valve 49.

Sufficient rise of brake pipe pressure in chamber 38 above pressure in auxiliary chamber 37 will move diaphragm 42 and therewith release valve 40 to extreme left, thus compressing spring 46, in which position of release valve 40 the brake cylinder exhaust passage 133 via port 134 is closed. Said sufficient amount of pressure is governed by value of spring 46. When pressures influencing diaphragm 42 have equalized, said diaphragm and attached release valve 40 will be returned to normal position by spring 46.

*Service application*

Assume that all valves are in normal position as shown in Figs. 2 to 5, and that a service rate of brake pipe pressure reduction is initiated by engineer as usual.

When chamber 6a, Fig. 2, is connected to atmosphere, there will be no movement of diaphragm 9, and its attached members towards the left from normal position. A reduction in brake pipe pressure in chamber 6a at a sufficient rate to effect movement of triple valve piston 14 towards the right, will close charging feed groove 108, thus preventing reduction of auxiliary reservoir pressure via said feed groove 108. When brake pipe pressure in chamber 6a, Fig. 2, has been reduced sufficiently below that of pressure in auxiliary reservoir 2, said triple valve piston 14, and attached valves 163 will be moved to the right, to full service or application position, in which position pressure in said auxiliary reservoir is connected to brake cylinder 1 of system via passage 162 and usual ports in slide valve 163 of triple valve 3. While said triple valve piston 14 is being moved into full service or application position, brake pipe pressure is momentarily connected to brake cylinder 1 via usual quick service ports in slide valves 163 of triple valve.

Check valves 26 and 27, Fig. 4, prevent equalization of pressure in said supplemental reservoir 30 with that of the auxiliary reservoir 2 via charging passage 110, of supplemental reservoir.

When a brake pipe pressure reduction is initiated in chamber 87 above diaphragm 86, Fig. 5, said diaphragm is deflected upward by retained supplemental reservoir pressure present in chamber 88, thus causing valve 85 to close charging passage 90 of accelerator reservoir 29. Brake pipe pressure in chamber 87 must be reduced slightly below the supplemental reservoir pressure in chamber 88 due to natural resistance of diaphragm 86 and to weight of check valve 85 and pressure plate 170, before said diaphragm 86 is deflected upward from normal position, so that accelerator reservoir pressure may initially feed back into the brake pipe via passages 90 and 95, thus preventing movement of valve 96 towards the right when a rapid rate of service reduction of brake pipe pressure is effected.

When service rate of brake pipe pressure reduction is initiated in chamber 84, movement of diaphragm 82 towards the right from normal position is resisted by spring 99; furthermore, pressure in accelerator reservoir 29 is permitted to reduce with the brake pipe pressure in chamber 77 via port 171 of accelerator valve 96, passage 95, check valve 94, passage 172, and duct 173, hence diaphragm 82 and valve 96 will remain in normal position, as shown in Fig. 5, unless the brake pipe reduction exceeds its usual service rate of reduction.

When the brake pipe pressure in chamber 38, Fig. 4, has reduced a sufficient amount below the pressure in auxiliary pressure chamber 37, diaphragm 42 will be deflected to the right, thus compressing stabilizing spring 47 until shoulder 174 contacts with stop 175. Auxiliary pressure chamber 37 being connected to supplemental reservoir 30, and the pressure in the latter being retained at initial pressure of the system by check valves 26 and 27, such movement of diaphragm 42 is therefore independent of any operation of triple valve 3, or any loss of pressure in auxiliary reservoir 2. In this position of diaphragm 42 port 176 of release valve 40, passages 132 and 175 will register, thus effecting a dispersion of brake pipe pressure at a rapid rate via reduction passages 129, 130, larger port 131 of resetting valve 49, and passages 132, port 176, passage 175 and duct 39, and simultaneously brake cylinder exhaust passage 133 is closed by release valve 40. When the brake pipe pressure in chamber 38 has reduced a sufficient amount below that of the pressure in supplemental reservoir 30, which sufficient amount is governed by the resistance of spring 56, diaphragm 51 will be deflected towards the left, thus compressing spring 56 until shoulder 177 contacts with stop 178, see Fig. 4. Diaphragm 42 is not restrained by spring 46; the latter serves merely to restrain movement of diaphragm 42 from normal to extreme left position, in response to normal rate of increase in pressure in chamber 38. The spring 47 is merely a stabilizing spring to prevent undesired movement of diaphragm 42 towards the right from normal position, due to slight reduction of pressure in chamber 38 below that in chamber 37. On the other hand, diaphragm 51 is restrained in its movement to its extreme left position in response to reduction of pressure in chamber 38 by spring 56, which has a much greater value than spring 47. Shoulder of stem 52 now has contacted with resetting valve 49, thus positioning the resetting valve towards the left, thereby closing supplemental reservoir charging passage 111, and connection 125 from supplemental reservoir 30 to auxiliary pressure chamber 37.

Restricted port 179 of resetting valve 49 now registers with passage 130 so that further dispersion of brake pipe pressure via passage 175 is at a slower rate.

At the same time special reservoir 31 is connected to atmosphere via elongated port 120 of resetting valve 49, and port 148 of such valve registers with passage 126, thus connecting pressure in auxiliary reservoir 2 with auxiliary chamber 37 via passage 151, duct 150, passage 149, port 148 in resetting valve 49, passage 126, duct 127, and passage 128. Restricted orifice or duct 127 controls rate of equalization of said pressures in auxiliary chamber 37 with auxiliary reservoir 2. Pressure in auxiliary chamber 37 in excess of that in auxiliary reservoir 2 tends to boost the latter, thus increasing sensitivity of triple valve piston 14, Fig. 2, and promoting application of brakes.

A further service reduction in brake pipe pressure in chamber 38 below that of retained pressure in supplemental reservoir 30, sufficient to overcome resistance of spring 57, will deflect diaphragm 51, and therewith resetting valve 49 will be positioned to the extreme left, thus compressing spring 57 until shoulder 180 contacts with stop 181.

During such movement of diaphragm 51, member 182 contacts with member 183, thus returning diaphragm 42 and release valve 40 to normal position, and thus closing passage 132, if it has not been closed in advance of this movement by valve 64, and terminating further dispersion of brake pipe pressure thru duct 39. In the last mentioned position of resetting valve 49, passages 126 and 149 are still connected by elongated port 148 of said resetting valve, and passages 156 and 121 are still connected by the elongated port 120 of this valve.

Retained supplemental reservoir pressure in chamber 66 acting downward on diaphragm 70 offers resistance to movement of diaphragm 69 upward; however, when the brake pipe pressure in chamber 65 is reduced a sufficient amount—governed by the area of diaphragm 70—below the retained pressure in supplemental reservoir 30, diaphragms 69 and 70 will be deflected upward, thus seating supplemental valve 64 and closing brake pipe pressure reduction passage 130, since chamber 66 is connected to supplemental reservoir 30. Chamber 68 is connected directly to the brake cylinder 1 of the system; hence, when the brake pipe pressure in chamber 65 has reduced, and the brake cylinder pressure has built up in a sufficient ratio,—governed by the areas of diaphragms 69 and 70—said supplemental valve 64 will be moved upward, and the greater the brake cylinder pressure present in chamber 68, when brake pipe pressure reduction is initiated, the lesser the amount of brake pipe pressure reduction in chamber 65 is required to close passage 130; thus minimizing the amount of dispersion of brake pipe pressure via passage 130. When the brake pipe pressure dispersion passage 175 is closed by either release valve 40 or supplemental valve 64, any further local dispersion of brake pipe pressure is controlled entirely by the usual quick service feature of the triple valve 3, which vents brake pipe pressure to brake cylinder 1 when the slide valves of the triple valve are placed in quick service position.

When resetting valve 49 has been positioned to extreme right from normal position, due to rapid rise in brake pipe pressure in chamber 38, during release and charging of brake system, special reservoir 31, Fig. 4, and chamber 6b, Fig. 2, are charged to normal system pressure. When a reduction in brake pipe pressure in chamber 6a, Fig. 2, has been initiated, diaphragm 9 and plungers 13 will be moved towards the left to their positions in Fig. 3. Plungers 13 act as restraining means to limit the travel of triple valve piston 14 to that of closing the charging feed groove 108, thus preventing loss of pressure in auxiliary reservoir 2 via feed groove 108. In this position of the slide valves 163 controlled by piston 14 of triple valve 3, said auxiliary reservoir is not connected to brake cylinder 1, thus delaying brake application, which delay is continued until diaphragm 9 relinquishes control of triple valve piston 14. A sufficient brake pipe pressure reduction in chamber 38, Fig. 4, below that of pressure retained in supplemental reservoir 30 will deflect diaphragm 51 towards the left, thus again positioning resetting valve 49 towards the left, and thereby connecting special reservoir 31 as well as chamber 6b, Fig. 2, to atmosphere. This venting to atmosphere is controlled by ducts 119 and 124, therefore there will be no sudden complete reduction of the pressure in special reservoir 31 and its connected chamber 6b. Diaphragm 9 being of larger area than that of piston 14, when pressure in chamber 6b has been reduced in a sufficient amount, depending on brake pipe pressure reduction initiated in chamber 6a, diaphragm 9 and therewith restraining plungers 13 will be forced towards the right by piston 14, causing auxiliary reservoir 2 of triple valve 3 to be connected to brake cylinder 1 via the usual service ports in slide valves 163 of the triple valve. The greater the amount of brake pipe pressure reduction initiated via chamber 6a the greater will be the pressure reduction required in chamber 6b to permit movement of triple valve piston 14 to service position, and the application of the brakes will be relatively delayed.

*Lap*

In any case when the pressure in auxiliary reservoir 2 has reduced via brake cylinder 1 slightly below that of brake pipe pressure in chamber 6a, Fig. 2, the piston 14 and graduating valve of slide valves 163 controlled by said piston will be positioned towards the left from service position, thus closing connection between auxiliary reservoir 2 and brake cylinder 1 via ports in the slide valves 163 of the triple valve 3.

*Release and recharge following service brake application*

When the engineer places the automatic brake valve in release position, in order to initiate release and recharge of brake system, excess main reservoir pressure stored at locomotive is connected directly to train brake pipe via large port of locomotive brake valve, thus rapidly increasing the rise in brake pipe pressure above normal system charging pressure in the vicinity of the locomotive. But in the vicinity remote from the locomotive the rate of rise in brake pipe pressure is still at normal charging rate of the system. After a few seconds the engineer returns his automatic brake valve to running position in which position a feed valve at the locomotive limits the maximum brake pipe pressure desired when the system is fully charged.

Rise in brake pipe pressure in chamber 6a, Fig. 2, slightly above that of pressure in auxiliary reservoir 2 will return piston 14 and slide valves 163 of triple valve 3 to normal position, in such position opening charging feed groove 108 to permit recharge of the auxiliary reservoir; also pressure in brake cylinder 1 is connected to underside of release valve 40, Fig. 4, via the ports in the slide valves 163 of the triple valve 3, and thence thru passages 20, 21 and 133. A rapid rise in brake pipe pressure in chamber 6a will move piston 14 to extreme left, thus restricting charging passage or feed groove 108, and correspondingly reducing rate of recharge of the auxiliary reservoir 2.

Charging passage 90 of accelerator reservoir 29, Fig. 5, is closed by retained supplemental reservoir pressure present in chamber 88 under diaphragm 86, deflecting this diaphragm upwards; at the same time reduction passage 172 is closed by check valve 94; hence, a comparatively slight rise in brake pipe pressure in chamber 77 above the pressure in chamber 84 will deflect diaphragm 82 towards the left, unseating auxiliary valve 33. Retained pressure in supplemental reservoir 30 can now equalize with brake pipe pressure via duct 80, check valve 79, passage 32 and chamber 184, and thus boosting brake pipe pressure. This boosting of brake pipe pressure insures prompt movement of triple valve piston 14, Fig. 2, to normal release position. The rise in brake pipe pressure might otherwise be at to slow a rate, due to ring leakage around said piston 14, to build up necessary pressure differential required to move said triple valve piston 14 and attached slide valves, towards the left from service lap position.

With equalization of supplemental reservoir and brake pipe pressures, diaphragm 86 will be returned to normal position, as shown in Fig. 5, thus opening charging passage 90. When accelerator reservoir 29 has been recharged sufficiently, diaphragm 82 will be returned to normal position by spring 78 and auxiliary valve 33 will be closed.

A rise in brake pipe pressure in sufficient amount, governed by value of spring 92, in chamber 87 above pressure in chamber 88, will deflect diaphragm 86 downward, thus compressing spring 92 and permitting valve 85 to be closed, thus again closing charging passage 90, and preventing a possible overcharge of accelerator reservoir 29. When excess brake pipe pressure has been reduced sufficiently, diaphragm 86 will be returned to normal position by spring 92, thus reopening charging passage 90. Diaphragm 86 cannot be deflected upward from normal position until brake pipe pressure has been reduced below that of the supplemental reservoir pressure in chamber 88; hence, any excess pressure present in accelerator reservoir 29 may equalize with the brake pipe pressure via both charging passage 90 and reduction passage 95, thus preventing movement of accelerator valve 96 from normal position, by a service rate of brake pipe pressure reduction.

With partial equalization of supplemental reservoir and brake pipe pressures via valve 33, diaphragm 51, and attached resetting valve 49, will be moved towards the right by pressure of spring 56 against shoulder 185 of stem 52, until sliding member 177 contacts stop 186. In this position of resetting valve 49 auxiliary reservoir 2 is still connected to auxiliary chamber 37 via passage 126, port 148 and passage 149. Special reservoir 31 is connected to atmosphere via passages 155, 156, port 120 and passage 121, and brake pipe dispersion passage 130 and charging passage 111 are closed, thus preventing a recharge of said supplemental reservoir 30 until said resetting valve 49 has been returned to normal position, as shown in Fig. 4.

When the brake pipe pressure in chamber 38 has raised sufficiently above the pressure in supplemental reservoir 30 said resetting valve 49 will be returned to normal position, as shown in Fig. 4, thus opening charging passage 111 from auxiliary reservoir 2 to supplemental reservoir 30, connection from said auxiliary reservoir to auxiliary chamber 37 is closed, and said auxiliary reservoir is now connected to supplemental reservoir via port 125.

A rapid rise in brake pipe pressure in chamber 38 to a sufficient amount, which amount is determined by value of spring 54, above pressure in supplemental reservoir 30, will deflect diaphragm 51 towards the right from normal position, thus compressing spring 54, and moving said resetting valve 49 to its extreme right position, in which position connection from supplemental reservoir 30 to auxiliary chamber 37 is closed, and auxiliary chamber 37 is connected to auxiliary reservoir 2 via passage 149, port 147 in resetting valve 49, and passage 146, and simultaneously connection from special reservoir 31 to atmosphere is closed, and special reservoir 31 is connected to auxiliary reservoir 2 via passage 149, port 148 in resetting valve 49, passage 152, check valve 153 and passage 154, duct 119, and passages 118, 57 and 60. When pressures influencing diaphragm 51 have equalized, this diaphragm will be returned to normal position by spring 54; but resetting valve 49 will remain in extreme right position, since stem 52 is permitted sufficient free longitudinal movement before shoulder 195 contacts with resetting valve 49. If the auxiliary reservoir 2 should receive an overcharge due to rapid rate of rise in brake pipe pressure, chamber 6b, Fig. 2, will receive the same overcharge, since it is also connected to auxiliary reservoir 2 via resetting valve 49; hence, if the brake pipe pressure in chamber 6a is reduced below that of said auxiliary reservoir pressure, diaphragm 9 will be deflected towards the left, as shown in Fig. 3, thus moving plungers 13 towards the left; said plungers 13 now act as restraining means to limit travel of triple valve piston 14 to position closing of auxiliary reservoir charging feed groove 108, and thus preventing a brake application. When brake pipe pressure is again sufficiently higher than that of said auxiliary reservoir pressure, said triple valve piston 14 and diaphragm 9 will be returned to normal position, shown in Fig. 2.

Deflection of diaphragm 42, Fig. 4, towards the left from normal position is resisted by spring 46, while rise in brake pipe pressure in chamber 38 is at a normal rate; hence, release valve 40 will remain in normal position, thus permitting pressure from brake cylinder 1 to vent to atmosphere via triple valve exhaust passage 20 and passages 21, 133, port 134 in release valve 40, passage 135, duct 136, and passage 137. A rapid rate of rise in brake pipe pressure in chamber 38 to right of diaphragm 42 will deflect this diaphragm towards the left, thus compressing spring 46 and moving release valve 40 to extreme left, in which position brake cylinder exhaust passages 133 and 135 do not register with port 134 in release valve 40, thus delaying release of brake cylinder pressure. When pressures influencing diaphragm 42 have substantially equalized, release valve 40 will be returned to normal position (shown in Fig. 4) by spring 46.

With equalization of brake pipe and supplemental reservoir pressures, supplemental valve 64 will be returned to normal position, shown in Fig. 4. When brake cylinder pressure in chamber 68, together with spring 74 acting upward on diaphragm 71 exceeds pressure in supplemental reservoir 30 acting downward on small diaphragm 70 (supplemental reservoir 30 being connected to chamber 66 via passage 140) supplemental valve 64 will be moved up to close brake pipe reduction passage 130. However, with reduction in brake cylinder pressure, via exhaust passage 135, to atmosphere, said supplemental valve 64 is returned to normal position, thus again opening brake pipe dispersion passage 130.

*Emergency application*

A rapid rate of reduction of brake pipe pressure in chamber 6a, Fig. 2, will move triple valve piston 14 to the extreme right, in which position graduating spring 8 is fully compressed, and piston 14 contacts with gasket 198. In this position of slide valves 163, controlled by piston 14, a connection is effected between the pressure in brake pipe 10 and brake cylinder 1, via usual emergency check valve 199 of triple valve 3, which permits brake pipe pressure to reduce into the brake cylinder 1; said emergency check valve 199 preventing return flow of pressures from brake cylinder 1 to the brake pipe 10. Auxiliary reservoir 2 is connected to brake cylinder 1 via usual large ports in slide valve 163 of triple valve 3, controlled by piston 14, thus permitting an initial rapid build-up of brake cylinder pressure.

Only those resetting valves 49 as are located at the head end of the train take extreme right hand position during release and recharge of brake system, as explained under "service application" above. Assuming that resetting valve has been moved to its extreme right hand position during release and recharge of the brake system a rapid rate of reduction in brake pipe pressure in chamber 6a will now deflect diaphragm 9 towards the left from normal position, thus positioning plungers 13, as shown in Fig. 3. Plungers 13 now act as restraining means to limit travel of triple valve piston 14 to that of closing charging feed groove 108, in which position of the slide valves 163 of triple valve 3, controlled by said piston 4, auxiliary reservoir 2 is not connected to brake cylinder 1 via ports in said slide valves 163. When resetting valve 49 has been positioned towards the left from its extreme right position, by reduction in brake pipe pressure in chamber 38, special reservoir 31 is connected to atmosphere via passages 57, 118, duct 119, passages 155, 156, port 120 in resetting valve 49, and passages 121, 122, 123 and duct 124. Further movement of piston 14, and therewith slide valves 163 of triple valve 3 towards the right will be delayed until pressure in chamber 6b has been reduced a sufficient amount, which amount is governed by area of diaphragm 9 and pressure reduction initiated in chamber 6a. The said delay period will be longer than in case of a service application due to the fact that emergency brake pipe pressure reduction in chamber 6a is much greater than a service reduction. Diaphragm 9 is of larger area than that of piston 14, hence, this diaphragm will be positioned towards the left, as shown in Fig. 3, until the pressure in chamber 6b has been reduced a sufficient amount, which amount is governed by the pressure reduction in chamber 6a and area of diaphragm 9, since the pressure to the left of triple valve piston 14 remains constant until said piston 14 has been permitted to move to application position. But the venting to atmosphere of special reservoir 31 is controlled by the ducts 119 and 124. Chamber 6b, Fig. 3, is connected directly to special reservoir 31. Assuming that pressure in chamber 6b is being gradually reduced, due to movement of resetting valve 49, Fig. 4, towards the left from its extreme right hand position (as would be caused either by service or emergency brake pipe pressure reduction), since chamber 6b is connected to special reservoir 31, said movement of resetting valve 49 to the left would permit only slow venting of special reservoir 31, and therewith chamber 6b to the atmosphere. But as soon as pressure in chamber 6b has been reduced to such amount that pressure in auxiliary reservoir 2, acting against the left side of triple valve piston 14, plus pressure in chamber 6a acting against the left side of diaphragm 9, is greater than pressure on the right side of diaphragm 9, plus pressure on the right side of triple valve piston 14, diaphragm 9 will be deflected towards the right, as shown in Fig. 3, permitting movement of piston 14 to application position.

At the end of initial delay period, auxiliary reservoir 2 is connected to brake cylinder 1, via usual ports in slide valves 163 of triple valve 3 controlled by piston 14. With rapid reduction in pressure in said auxiliary reservoir 2 diaphragm 9 may again be deflected towards the left as shown in Fig. 3, thus returning piston 14 to lap position, and therewith so positioning graduating valve, an element of the triple valve 3, as to close connection from said auxiliary reservoir 2 to the brake cylinder 1, thus momentarily terminating building up of brake cylinder pressure from auxiliary reservoir. But, when the pressure in chamber 6b then continues to reduce, diaphragm 9 will be returned to normal position, thus again opening connection from auxiliary reservoir 2 to brake cylinder 1.

When brake pipe pressure reduction is initiated in chamber 87, Fig. 5, diaphragm 86 is deflected upward, thus closing charging passage 90. Equalization of pressure in accelerator reservoir 30 via duct 173 cannot keep pace with said rapid rate of brake pipe pressure reduction, hence diaphragm 82 will be deflected towards the right from normal position, thus compressing spring 104 until shoulder 198 strikes stop 199; valve 33 not being disturbed. In this position of diaphragm 82 and its attached accelerator valve 96, reduction passage 95 from accelerator reservoir 29 to brake pipe chamber 77 is closed. While accelerator valve 96 is in its last mentioned position pressure in accelerator reservoir 29 is connected to the under side of actuator diaphragm 105, via port 171, and passage 200. Actuator diaphragm 105 is now deflected upward, thus unseating pressure actuated valve 103, and connecting brake pipe pressure to atmosphere via auxiliary reduction passage 102.

When pressure in accelerator reservoir 29 has reduced sufficiently via duct 101 to atmosphere, accelerator valve 96 will be returned to normal position by spring 99. With return of diaphragm 105 to normal posiiton pressure actuated valve 103 is again returned to its seat by spring 104.

Diaphragms 42 and 51, Fig. 4, will come to rest with diaphragm 42 deflected towards the right from normal position until shoulder 174 contacts with stop 175; and diaphragm 51 will be deflected towards the left, thus compressing spring 57 until member 180 contacts with stop 181. Resetting valve 49 is now positioned to connect auxiliary reservoir 2 to auxiliary chamber 37, and special reservoir 31 is connected to atmosphere.

When brake pipe pressure in chamber 65 is reduced a sufficient amount, supplemental valve 64 will be forced upward to its seat, thus closing brake pipe dispersion passage 130; and supplemental valve 64 is held on its seat by spring 74, and by brake cylinder pressure in chamber 68, deflecting diaphragm 69 upward.

*Release following an emergency application*

When in recharging of brake system the brake pipe pressure in chamber 6a, Fig. 2, has been raised sufficiently above that of the pressure in auxiliary reservoir 2, triple valve piston 14 will be returned to normal position, thus again opening charging feed groove 108. In this position of slide valve 163, controlled by piston 14, the usual slide valves 163 of triple valve 3 close connection from auxiliary reservoir 2 to brake cylinder 1, and brake cylinder pressure is connected to exhaust passage 20 from triple valve 3 to attachment 6, Fig. 1.

Since charging passage 90 and reduction passage 95, see Fig. 5, are closed during emergency application, and accelerator reservoir pressure in chamber 84, at the left of diaphragm 82, has been permitted to reduce via duct 101 to atmosphere until accelerator valve 96 has been returned to normal position by spring 99, a comparatively slight increase in brake pipe pressure in chamber 77 is only required to deflect diaphragm 82 towards the left from its normal position, thus compressing spring 78 and unseating auxiliary valve 33. Pressure from supplemental reservoir 30 can now equalize with the brake pipe pressure via duct 80, check valve 79, and passage 32 into chamber 77. With equalization of supplemental reservoir and brake pipe pressures, diaphragm 86 is returned to normal position, again opening charging passage 90. When accelerator reservoir 29 has been recharged sufficiently, diaphragm 82 will be returned to normal position, and auxiliary valve 33 will be returned to its seat by spring 78. When brake pipe pressure in chamber 38 has been increased sufficiently above that of the pressure in supplemental reservoir 30, diaphragm 51 and resetting valve 49 will be returned to normal position. Pressure in auxiliary reservoir 2 can now equalize with pressure in supplemental reservoir 30, via the passages 109, 110, duct 202 and check valves 26 and 27, passage 111 and port 112 in resetting valve 49. By providing means for a local boosting of brake pipe pressure and reduction of pressure in auxiliary reservoir 2 below emergency equalization pressure, less time is required to return triple valve piston 14, Fig. 2, and its attached slide valves 163 to normal positions, so as to connect pressure in brake cylinder 1 to exhaust passage 20. If the brake pipe pressure in chamber 38 is increased a sufficient amount, governed by value of spring 54, above pressure in supplemental reservoir 30 by the engineer, as is common where a rapid rise in brake pipe pressure is initiated, the diaphragm 51 of the valve units of brake equipment of cars located near the locomotive will be deflected towards the right from normal position, thus positioning resetting valve 49, so that special reservoir 31 is connected to auxiliary reservoir 2. Diaphragm 51 may now be returned to normal position, by spring 54, without disturbing resetting valve 49, since stem 52 of diaphragm 51 is permitted sufficient longitudinal movement before its shoulder 195 connects with resetting valve 49. When brake pipe pressure in chamber 38 has been increased slightly above pressure in auxiliary chamber 37, release valve 40 is returned to normal position, such movement being assisted by stabilizing spring 47. In normal position of release valve 40, brake cylinder exhaust passage 133 is connected to atmosphere via port 134 and passage 135. If the brake pipe pressure in chamber 38 is increased a sufficient amount—governed by value of spring 46—above pressure in auxiliary chamber 37, as is common where a rapid rise in brake pipe pressure is initiated, diaphragm 42 of brake equipment of cars located in vicinity of the locomotive will be deflected towards the left from normal position, thus compressing spring 46, in which position port 134 of release valve 40 does not register passages 133 and 135, thus delaying release of brake cylinder pressure. With substantial equalization of pressures influencing diaphragm 42 release valve 40 will be returned to normal position by spring 46.

With substantial equalization of pressures in supplemental reservoir 30 with the brake pipe pressure, and sufficient reduction of emergency brake cylinder pressure in chamber 68, under diaphragm 71, such amount being governed by area of diaphragm 70 and pressure in chamber 66, supplemental valve 64 will also be returned to normal position, thus again opening brake pipe reduction passage 130.

Modifications

The following modifications may be introduced in the construction described.

When valve 203 is rotated to position shown in Fig. 7 by handle 50, special reservoir 31 and its connected chamber 6b, see Fig. 2, are connected to atmosphere via port 204, thus rendering inoperative the members controlled by pressures in special reservoir 31 and chamber 6b. In short train handling, delay features controlled by diaphragm 9, see Fig. 2, are not necessary for smooth brake operations. These delay features controlled by diaphragm 9 may also be rendered inoperative by the engineer preventing rapid rise in brake pipe pressure; in which case diaphragm 51 and attached resetting valve 49 will not be moved towards the right from their normal position, and special reservoir 31 will be connected to atmosphere.

In order to provide means for preventing the rapid building up of brake cylinder pressure in cars near the engineer's valve of the locomotive, I provide a manually operated valve 61 which may be positioned to place port 122 in registration with passage 63, and simultaneously closing passage 123 to atmosphere. I further provide a manually operated valve 203, by which, when positioned as shown in Fig. 8, chamber 6b is connected to atmosphere via passage 160, and port 205 in valve 203, thus rendering inoperative the members controlled by pressures in the chamber 6b. Simultaneously port 57 registers with passage 60, thus permitting charging of special reservoir 31, via resetting valve 49, when the latter is moved to the extreme right from normal position by rapid rise in brake pipe pressure in chamber 38.

A sufficient amount of reduction in brake pipe pressure in chamber 38 below initial charge of system—such sufficient amount being governed by value of spring 56—will again return said resetting valve 49 towards the left from its extreme right position, thus connecting retained pressure in special reservoir 31 to brake pipe via passage 60, port 57, passages 118, duct 119, passages 155, 156, port 120 in resetting valve 49, passage 121, port 122, passage 63, check valve 206, passage 207, and duct 208; thus offsetting the rapid reduction in brake pipe pressure by permitting pressure in special reservoir 31 to feed into the brake pipe via the last mentioned connections, which constitute equalization passages between special reservoir 31 and the brake pipe. Check valve 206 prevents recharging of special reservoir 31 from the brake pipe pressure via said equalization passages.

The pressure is fed slowly into the brake pipe, but only at the head of the train, as this is the only vicinity in which special reservoir 31 is charged, and is the vicinity where the brake pipe pressure service reduction is initially rapid, relative to remainder of train, due to proximity of engineer's brake valve. The brake pipe pressure reduction is still occurring when stored pressure from special reservoir 31 is permitted to equalize with the brake pipe via the equalization passages mentioned in preceding paragraph; for it is not necessary that the service brake pipe pressure reduction be completed in order to effect movement of diaphragm 51 towards the left from normal position, so as to position said resetting valve 49 to open said equalization passages. The amount of brake pipe reduction required to deflect diaphragm 51 towards the right is governed by valve of spring resistance 56. It is not intended to build up the brake pipe pressure at the head end of the train sufficient to cause release of brakes, but only to retard completion of the initial reduction, by feeding pressure slowly into the brake pipe. In the meantime the quick service reduction is being rapidly propagated towards the rear of the train. Volume of special reservoir 31 is small, therefore it will quickly equalize with the brake pipe pressure, and the effect of the feed back feature will be only momentary, excepting for the increased volume in the brake pipe of each car at head of train, due to the fact that reservoir 31 is now connected, since the greater the volume of the brake pipe pressure, the slower will be the rate of brake pipe pressure reduction at the head end of the train.

While the actuating means for the operating parts have been shown for convenience to consist of diaphragms, obviously these diaphragms could readily be substituted by pistons without changing the principle of my invention.

I claim:

1. In an air brake system of the character described, the combination with an auxiliary reservoir of a special reservoir, a means for connecting said special reservoir with said auxiliary reservoir, or with the brake pipe of the system, a valve included in said means, and pressure actuated means operating said valve, whereby upon predetermined rate of rise in brake pipe pressure said valve is positioned to charge said special reservoir, and when the brake pipe pressure has reduced a predetermined amount said valve is positioned to disburse pressure from said special reservoir to retard the rate of reduction in brake pipe pressure.

2. The combination described by claim 1 including means for preventing back flow of pressure from special reservoir into auxiliary reservoir and further means for preventing back flow of pressure from brake pipe into the special reservoir.

3. In an air brake system of the character described, an auxiliary control comprising a chamber divided by two pressure actuated elements into an intermediate chamber connected with the brake pipe of the system, an auxiliary pressure chamber and a supplemental reservoir connected with, and charged from an auxiliary reservoir of the system, means preventing the return flow from said supplemental reservoir to said auxiliary reservoir, said intermediate chamber having a reduction outlet to atmosphere, a release valve operated by one of said pressure actuated elements controlling said outlet, said auxiliary pressure chamber connected with said supplemental reservoir, and further having an equalizing connection to said auxiliary reservoir, a resetting valve operated by the other pressure actuated element, and controlling the last mentioned connections.

4. The combination described by claim 3 distinguished in that the first mentioned chamber is divided by two stabilized pressure actuated elements into an intermediate chamber connected with the brake pipe of the system, an auxiliary pressure chamber and a supplemental reservoir connected with and charged from an auxiliary reservoir of the system.

5. The combination described by claim 3 distinguished in that the resetting valve also controls the brake pipe reduction outlet.

6. The combination described by claim 3 distinguished in that the outlet of the exhaust passage of the brake cylinder of the system is controlled by said release valve.

7. In an air brake system of the character described, the combination with a brake cylinder, auxiliary reservoir and triple valve, of means for delaying the connection of the auxiliary reservoir to the brake cylinder relatively to the rate of pressure reduction in the brake pipe of the system, said delaying means comprising a special reservoir for storing a charge of pressure obtained from the auxiliary reservoir, pressure-actuated means responsive to increase and decrease in brake pipe pressure, controlling the charging of said special reservoir and the disbursement of pressure therefrom, other pressure-actuated means associated with the triple valve and connected on one side with said special reservoir and on the other side with the brake pipe, the latter means operated by reduction of brake pipe pressure, and whereby the movement of the triple valve to application position is delayed relatively to the brake pipe reduction initiated in the system.

8. In an air brake system of the character described, the combination with the brake pipe and an auxiliary reservoir, of a supplemental reservoir charged from said auxiliary reservoir, means preventing return flow from said supplemental reservoir, an auxiliary pressure chamber connected with said supplemental reservoir and with said auxiliary reservoir, a valve controlling said connections of the auxiliary pressure chamber, said valve actuated by differential in pressures in brake pipe and said supplemental reservoir, an auxiliary valve opened by rise in brake pipe pressure to permit flow of pressure from the supplemental reservoir into the brake pipe, and a check valve adapted to permit such flow via auxiliary valve and to prevent return flow of said pressure, said auxiliary valve adapted to close when the pressure in the brake pipe equals that of said supplemental reservoir.

9. The combination described by claim 8 including pressure influenced resistance imposed upon said valve controlling the connections of said chamber with said supplemental reservoir and said auxiliary reservoir, whereby the movement of said valve into position connecting said auxiliary pressure chamber with the auxiliary reservoir is delayed until brake pipe pressure is reduced a predetermined amount.

10. The combination described in claim 8 including pressure influenced means operated by a rise in brake pipe pressure following equalization of supplemental reservoir and brake pipe pressures, whereby in response to a slow rate of such rise in brake pipe pressure, the resetting valve controlling the connections of the auxiliary pressure chamber with said supplemental reservoir and the auxiliary reservoir is positioned to permit the charging of said auxiliary pressure chamber from the supplemental reservoir, and a more rapid rise of brake pipe pressure will position said valve to connect said auxiliary pressure chamber with the auxiliary reservoir.

11. In an air brake equipment of the character described, the combination of an auxiliary pressure chamber, a pressure actuated release valve contained in said chamber and controlling the reduction outlet of the brake pipe of the equipment, a pressure actuated resetting valve also controlling said outlet, a supplemental reservoir connected to a port of said resetting valve, the resetting valve positioned by a predetermined reduction of brake pipe pressure to connect said supplemental reservoir with said auxiliary pressure chamber, an auxiliary valve in its closed position preventing flow of supplemental reservoir pressure into brake pipe, and said auxiliary valve opened by rise of brake pipe pressure above initial charge, thus permitting said flow, a further rise in brake pipe pressure causing the resetting valve to be positioned to connect supplemental reservoir pressure to auxiliary pressure chamber, and still further rise in brake pipe pressure causing resetting valve to be positioned to connect said auxiliary reservoir with said auxiliary pressure chamber.

12. In an air brake system of the character described, the combination of a pressure actuated release valve controlling the brake pipe reduction outlet, a pressure actuated resetting valve also controlling said outlet, a supplemental reservoir charged to normal system pressure and connected to one side of the means for actuating said release valve, means for retaining pressure in said supplemental reservoir, a supplemental valve also controlling said outlet, the latter valve operated by differential of effective pressures between the brake cylinder and the brake pipe, whereby reduction of brake pipe pressure and the increase of brake cylinder pressure to a predetermined ratio with said reduction will position said supplemental valve to close said outlet.

13. In an air brake system of the character described, the combination of a supplemental reservoir charged from an auxiliary reservoir of the system, means preventing return flow of such charge, an accelerator reservoir charged from the brake pipe of the system, a reduction outlet from said accelerator reservoir to said brake pipe, a check valve preventing return flow from brake pipe to said accelerator reservoir, a pressure actuated valve controlling the charging of said accelerator reservoir, the latter valve opened by equalization of brake pipe and supplemental reservoir pressures, and said valve closed by reduction of brake pipe pressure, a chamber divided by a pressure actuated element having one side connected to brake pipe pressure and its other side connected to said accelerator reservoir, a connection from supplemental reservoir to brake pipe, an auxiliary valve controlling the latter connection and operated by said pressure actuated element.

14. In an air brake system of the character described, means for accelerating the release of the brakes comprising a supplemental reservoir charged from an auxiliary reservoir of the system, means preventing return flow of such charge, an accelerator reservoir charged from the brake pipe of the system, a reduction outlet from said accelerator reservoir to said brake pipe, a check valve preventing return flow from brake pipe to said accelerator reservoir, a pressure actuated valve controlling the charging of said accelerator reservoir, the latter valve opened by equalization of brake pipe and supplemental reservoir pressures, and said valve closed by reduction of brake pipe pressure, a chamber divided by a pressure actuated element having one side connected to brake pipe pressure and its other side connected to said accelerator reservoir, a connection from supplemental reservoir to brake pipe, an auxiliary valve controlling the latter connection and operated by said pressure actuated element, a check valve preventing return flow of brake pipe pressure into supplemental reservoir, pressure actuated means controlling the charging of said supplemental reservoir.

15. In an air brake system of the character described, a combination of a supplemental reservoir charged from auxiliary reservoir of system, means for retaining such charge, an accelerator reservoir charged from brake pipe, a reduction outlet from accelerator reservoir to brake pipe, a check valve controlling such outlet, a pressure actuated charging control valve controlling such charging, the latter valve opened by equalization of brake pipe and supplemental reservoir pressures, and said valve closed by reduction in brake pipe pressure, an auxiliary brake pipe reduction outlet, a pressure actuated valve controlling such outlet, a chamber divided by a diaphragm having one side connected to brake pipe pressure, and its other side connected to said accelerator reservoir, and an accelerator valve operated by said diaphragm, such valve controlling the operations of said first mentioned valves, respectively.

16. The combination described by claim 15 including a pressure actuated means, a check valve cooperating with such means and adapted to prevent return flow of pressure from brake pipe into accelerator reservoir, said means controlling said brake pipe reduction outlet.

17. In an air brake system of the character described, means for accelerating the application of the brakes, comprising a valve operated by pressure actuated means, a supplemental reservoir charged from system pressure, means for retaining the charge in said supplemental reservoir and means for applying such retained pressure to operate said valve, an auxiliary pressure chamber, an auxiliary reservoir, connections between said auxiliary chamber and said supplemental reservoir, also between said auxiliary pressure chamber and said auxiliary reservoir, said valve controlling said connections; said valve by rise in brake pipe pressure being positioned to close the connection between auxiliary pressure chamber and auxiliary reservoir, and simultaneously opening the connection between auxiliary pressure chamber and supplemental reservoir; and said valve positioned by predetermined reduction in brake pipe pressure to close the connection from auxiliary pressure chamber to supplemental reservoir, and simultaneously opening the connection between auxiliary pressure chamber to the auxiliary reservoir, thus boosting the pressure in the latter and promoting the application of the brakes; said supplemental reservoir provided with a reduction outlet to the brake pipe pressure, and a pressure actuated auxiliary valve controlling such outlet, the latter valve normally closing said outlet, and being operated by a rise in brake pipe pressure to open said outlet.

18. In an air brake system of the character described, the combination of an equalizing connection in the triple valve from the brake pipe to the brake cylinder of the system, pressure actuated means incorporated in the triple valve controlling said connection, said means operated by reduction in brake pipe pressure, an auxiliary brake pipe reduction outlet, a release valve controlling said outlet, and operated by reduction in brake pipe pressure to open said outlet, a resetting valve also controlling said outlet, the latter valve operated by a greater reduction in brake pipe pressure than sufficient to cause the operation of said release valve, whereby excessive reduction in brake pipe pressure via said reduction outlet is prevented.

19. In an air brake system of the character described, the combination of a special reservoir charged from system pressure, pressure actuated means controlling such charging, such means charging said special reservoir in response to rapid rate of rise in brake pipe pressure, and in response to sufficient reduction in brake pipe pressure reducing pressure in special reservoir, pressure actuated means provided in the triple valve, the latter means controlling the admission of auxiliary reservoir pressure of the system into the brake cylinder, and these means operated by differential of pressures in said special reservoir and in said auxiliary reservoir, whereby brake cylinder pressure is built up in intermittent steps to required degree.

20. In an air brake system of the character described the combination of a brake pipe reduction outlet, a slide valve actuated by brake pipe pressure and controlling said outlet, the underside of said valve in one position covering said outlet, the upper side of said valve connected to the system pressure, a supplemental valve also controlling said outlet, this valve including a resistance element normally holding this valve closed until said resistance is overcome by sufficient rise in brake pipe pressure, whereby the opening of said outlet from the brake pipe to the underside of said slide valve is delayed until the system pressure is communicated to the upper side of said slide valve by rise in brake pipe pressure, and thus the unseating of such valve is prevented.

21. In an air brake system of the character described, the combination of a supplemental reservoir charged to normal system pressure, means for retaining such charge in said supplemental reservoir, a supplemental valve controlling the brake pipe pressure reduction outlet of the system, said supplemental valve normally being open, said supplemental valve controlled by a set of pressure actuated devices jointly responsive to the predetermined differentials of pressures in the brake pipe, said supplemental reservoir to brake cylinder of the system and external pressure, whereby reduction of brake pipe pressure and building up of brake pipe cylinder pressure in predetermined ratio will operate said set of devices to close said supplemental valve, and equalization of supplemental reservoir and brake pipe pressure together with sufficient reduction of brake cylinder pressure will open said supplemental valve.

22. The combination described by claim 21, including a reduction outlet from supplemental reservoir to the brake pipe pressure, and a pressure actuated auxiliary valve controlling said outlet and opened by sufficient rise in brake pipe pressure.

23. In an air brake system of the character described, the combination of a supplemental reservoir charged from system pressure, means for retaining the charge in said supplemental reservoir, a brake cylinder pressure exhaust passage, a pressure actuated release valve controlling said passage, said release valve in normal position opening said passage and closed by differentials of pressure in said supplemental reservoir and brake pipe of the system; said supplemental reservoir provided with a reduction outlet to the brake pipe pressure, and a pressure actuated auxiliary valve controlling said outlet and opened by a sufficient rise in brake pipe pressure.

24. In an air brake equipment of the character described, having a brake cylinder, an auxiliary reservoir and a triple valve, a means for accelerating the release of the brakes, following emergency and service applications, comprising a supplemental reservoir charged from the auxiliary reservoir, means restricting flow of pressure from said auxiliary reservoir into said supplemental reservoir, means preventing return flow, a pressure actuated resetting valve controlling said charging, an auxiliary pressure chamber, said resetting valve in normal position permitting the charging of said auxiliary pressure chamber, a pressure actuated release valve located in the last mentioned chamber, the brake cylinder having a restricted exhaust passage leading to said auxiliary pressure chamber, said release valve controlling such exhaust passage, a brake pipe chamber, pressure actuated elements contained in said brake pipe chamber, such elements responsive to brake pipe and supplemental reservoir pressures, a supplemental valve actuated by means also responsive to brake cylinder and supplemental reservoir pressures, a restricted outlet to atmosphere from brake pipe chamber, said supplemental valve in cooperation with said resetting valve and said release valve controlling said restricted outlet, an accelerator reservoir, a control valve operated by a pressure actuated element responsive to brake pipe and supplemental reservoir pressures, a further chamber divided by a pressure actuated element having one side connected to brake pipe pressure and its other side connected to said accelerator reservoir pressure, the latter reservoir having a reduction outlet to the brake pipe, means preventing return flow thru last mentioned reduction outlet, an accelerator valve operated by the last mentioned pressure actuated element, said accelerator valve controlling the charging of and dispersion from said accelerator reservoir, means also operated by the last mentioned pressure actuated element controlling the flow of supplemental reservoir pressure into the brake pipe, and further means preventing return flow of such pressure.

CARL R. JACK.